United States Patent
Lee et al.

(10) Patent No.: US 8,824,890 B2
(45) Date of Patent: Sep. 2, 2014

(54) OPEN OPTICAL ACCESS NETWORK SYSTEM

(75) Inventors: Han-Hyub Lee, Daejeon-si (KR);
Seung-Hyun Cho, Daejeon-si (KR);
Eui-Suk Jung, Daejeon-si (KR);
Eun-Gu Lee, Daejeon-si (KR);
Jong-Hoon Lee, Daegu-si (KR);
Jie-Hyun Lee, Daejeon-si (KR);
Sang-Soo Lee, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 90 days.

(21) Appl. No.: 13/388,298

(22) PCT Filed: Aug. 18, 2010

(86) PCT No.: PCT/KR2010/005443
§ 371 (c)(1),
(2), (4) Date: Jan. 31, 2012

(87) PCT Pub. No.: WO2011/021842
PCT Pub. Date: Feb. 24, 2011

(65) Prior Publication Data
US 2012/0128360 A1     May 24, 2012

(30) Foreign Application Priority Data

Aug. 18, 2009  (KR) .................. 10-2009-0076417
Jul. 21, 2010  (KR) .................. 10-2010-0070529

(51) Int. Cl.
*H04J 14/00* (2006.01)
*H04B 10/20* (2006.01)
*H04J 14/02* (2006.01)

(52) U.S. Cl.
CPC ..... *H04J 14/0282* (2013.01); *H04J 2014/0253* (2013.01); *H04J 14/0239* (2013.01); *H04J 14/0283* (2013.01); *H04J 14/028* (2013.01)
USPC ................ 398/72; 398/58; 398/71; 398/74; 398/75

(58) Field of Classification Search
USPC .................. 398/68, 70–72, 74, 75
See application file for complete search history.

(56) References Cited

U.S. PATENT DOCUMENTS

| | | | |
|---|---|---|---|
| 5,790,287 A * | 8/1998 | Darcie et al. | 398/108 |
| 7,366,415 B2 | 4/2008 | Lee et al. | |
| 7,434,249 B2 | 10/2008 | Park et al. | |
| 7,660,528 B2 * | 2/2010 | Hirth et al. | 398/72 |
| 7,773,838 B2 | 8/2010 | Lee et al. | |

(Continued)

FOREIGN PATENT DOCUMENTS

| KR | 2001-0003185 A | 1/2001 |
|---|---|---|
| KR | 2004-0082029 A | 9/2004 |

(Continued)

*Primary Examiner* — Dalzid Singh
(74) *Attorney, Agent, or Firm* — Rabin & Berdo, P.C.

(57) ABSTRACT

The present invention relates to an open optical access network system in which one optical access network is open to enable a plurality of service providers and a plurality of subscribers to simultaneously use the optical access network, to thereby improve the efficiency of using the optical access network, wherein each subscriber can be provided with a plurality of different services from the plurality of service providers, thereby enabling the flexible selection of services and the flexible change in services, thus improving the efficiency of using an optical infrastructure.

5 Claims, 7 Drawing Sheets

(56) References Cited

U.S. PATENT DOCUMENTS

| | | |
|---|---|---|
| 8,014,672 B2 | 9/2011 | Suzuki et al. |
| 8,131,156 B2 * | 3/2012 | Yu .................................. 398/168 |
| 8,369,706 B2 * | 2/2013 | Sorin ............................... 398/72 |
| 8,437,638 B2 * | 5/2013 | Kobayashi et al. ............. 398/90 |
| 2007/0147837 A1 | 6/2007 | Yoo et al. |
| 2008/0019693 A1 | 1/2008 | Sorin |
| 2008/0089699 A1 * | 4/2008 | Li et al. ......................... 398/197 |
| 2008/0310841 A1 * | 12/2008 | Lee et al. ........................ 398/63 |
| 2009/0047019 A1 * | 2/2009 | Palacharla et al. ............. 398/59 |
| 2012/0093509 A1 * | 4/2012 | Kazawa et al. ................. 398/58 |
| 2012/0281984 A1 * | 11/2012 | Iannone et al. ................. 398/68 |

FOREIGN PATENT DOCUMENTS

| | | |
|---|---|---|
| KR | 2005-0078044 A | 8/2005 |
| KR | 2007-0059919 A | 6/2007 |
| KR | 10-0813897 B1 | 3/2008 |
| KR | 2009-0045250 A | 5/2009 |
| KR | 10-0917852 | 9/2009 |
| WO | WO-2008/010866 A2 | 1/2008 |

* cited by examiner

OPEN OPTICAL ACCESS NETWORK SYSTEM

TECHNICAL FIELD

The present invention relates to an optical access network, and more particularly, to an open optical access network system, in which the optical access network is opened to a plurality of service providers and a plurality of subscribers such that the optical access network is used by the service providers and subscribers in common, thereby enhancing the efficiency in use of a single optical access network and allowing each subscriber to receive different types of services from the many service providers in multiple manners.

BACKGROUND ART

In general, the optical access network technology is widely used due to the characteristic of connecting a service provider to each subscriber through optical infrastructure and improving service quality.

FIG. 1 is a diagram schematically illustrating a conventional optical access network. As shown in FIG. 1, the optical access network includes a single service provider connected to a plurality of subscribers through a single optical infrastructure. Accordingly, in order for the subscriber to receive a service from another service provider, a new optical infrastructure needs to be built between the different service provider and the subscriber. In this case, the previous optical infrastructure which has been connected to the subscriber for the previous service provider is not available for use.

If the previous optical infrastructure is configured such that access of the other service provider is easily made instead of building a new optical infrastructure, the service provider can reduce the cost of building an optical infrastructure. In addition, the efficiency in use of the previous optical infrastructure is enhanced, thereby providing a user with cost effective services.

As an example of using the previous optical infrastructure as it is, a technology of using a wavelength division multiplexed signal light and a wavelength tunable light source has been suggested. This technology prevents implementation complexity of sending a supervisory control signal in addition to a signal wavelength to each subscriber and assigning wavelengths for transmission and reception.

That is, this technology provides an intelligent communication method in which each service provider apparatus and subscriber selects a signal wavelength without using a supervisory control signal. To this end, the service provider apparatus and subscriber each have a wavelength tunable laser transmitter and a wavelength tunable receiver equipped with a wavelength tunable filter. The service provider apparatus controls the signal wavelength, and an optical link is configured by an optical splitter.

The benefit of this technology is that an optical splitter is used and each service provider apparatus and subscriber selects wavelengths in an intelligent manner. However, this technology has a limitation in accessing of a plurality of service providers to the optical infrastructure in that respective service provider apparatuses need to share a single wavelength control circuit, thereby causing a difficulty in accessing the optical infrastructure.

That is, the need for another system enabling the service provider to share the optical infrastructure arises.

As another example of using the previous optical infrastructure as it is, an open optical access service model technique using a wavelength division multiplexing (WDM)-passive optical network (PON) has been suggested. This technique allows a service provider to send a signal desired by the service provider by including an Optical Cross Connect (OXC) in a central node. However, this technique is implemented by use of a wavelength division multiplexer provided in a remote node, so the wavelength assigned to each subscriber is limited to a signal wavelength, causing a difficulty in that each subscriber receives services from a plurality of service providers.

This has caused the need for a technique of reducing an additional system for managing each service provider system from an open optical access network and removing the limitation of wavelengths assigned to each subscriber.

DISCLOSURE

Technical Problem

The present invention provides an open optical access network system, in which an open optical infrastructure is configured such that a plurality of service providers and a plurality of subscribers are connected to the optical infrastructure of wavelength and frequency independency, allowing the subscriber to select and change services in a flexible manner and thus enhancing the use of efficiency of the open optical access network system.

Technical Solution

According to an aspect of the present invention, there is provided an open optical access network system allowing at least one subscriber to be connected to at least one service provider through a common optical infrastructure. The open optical access network system comprises an optical line terminal (OLT), an optical network unit (ONU) and an optical dividing/coupling unit. The open optical access network system is configured to transmit and receive an optical signal of some transport channels among all transport channels accommodated in the optical infrastructure. The ONU is configured to separate and receive an optical signal of a predetermined transport channel from the optical signal of the some transport channels and send the OLT an optical signal which is obtained by modulating the optical signal of the predetermined transport channel. The optical dividing/coupling unit is configured to divide or couple the optical signal transmitted and received between the OLT and the ONU.

According to an aspect of the present invention, there is provided an open optical access network system allowing at least one subscriber to be connected to at least one service provider through a common optical infrastructure. The open optical access network system comprises an OLT, an ONU and an optical dividing/coupling unit. The OLT transmits and receives an optical signal of a predetermined range of wavelengths. The ONU is configured to separate an optical signal of a predetermined wavelength from the optical signal received from the OLT. The ONU is configured to receive the separated optical signal of the predetermined wavelength and send an optical signal obtained by modulating the optical signal of the predetermined wavelength. The optical dividing/coupling unit is configured to divide or couple the optical signal transmitted and received between the OLT and the ONU.

The service provider may include at least one OLT such that an optical signal is transmitted and received in a predetermined portion of wavelengths among the entire range of wavelengths accommodated in the optical infrastructure.

The ONU may include a wavelength selector configured to separate an optical signal of a predetermined wavelength from the optical signal of the predetermined range of wavelengths and an optical transmitting/receiving unit configured to receive the optical signal of the predetermined wavelength separated by the wavelength selector and send an optical signal obtained by modulating the optical signal of the predetermined wavelength.

The optical dividing/coupling unit may include an N×1 optical splitter connected to the OLT, and a 1×N optical splitter connected to the ONU.

The wavelength selector is implemented as an arrayed waveguide grating (AWG) or an AWG having a cyclic characteristic such that optical signals having different wavelengths are connected to one another through a single terminal.

According to another aspect of the present invention, there is provided an open optical access network system allowing at least one subscriber to be connected to at least one service provider through a common optical infrastructure. The open optical access network system comprises an OLT, an ONU and an optical dividing/coupling unit. The OLT is configured to transmit and receive optical signals that are modulated in a wavelength division multiplexing (WDM) and a time division multiplexing (TDM). The ONU is configured to separate and receive an optical signal of a predetermined wavelength from the optical signal received from the OLT, separate and receive an optical signal of a predetermined time from the separated optical signal having the predetermined wavelength, and send the OLT an optical signal which is obtained by modulating the received optical signal of the predetermined wavelength or an optical signal which is obtained by modulating the received optical signal of the predetermined time. The optical dividing/coupling unit is configured to divide or couple the optical signal transmitted and received between the OLT and the ONU.

The service provider may include at least one OLT to perform modulation in a WDM using an optical signal of a predetermined range of wavelengths among an entire range of wavelengths accommodated in the optical infrastructure, or an OLT configured to perform modulation in a TDM using an optical signal of a predetermined wavelength.

According to another aspect of the present invention, there is provided an open optical access network system allowing at least one subscriber to be connected to at least one service provider through a common optical infrastructure. The open optical access network system comprises an OLT, an ONU and an optical dividing/coupling unit. The open optical access network system is configured to transmit and receive an optical signal of a predetermined range of frequencies among entire range of frequencies accommodated in the optical infrastructure. The ONU is configured to separate and receive an optical signal of a predetermined frequency from the optical signal of the predetermined range of frequencies and send the OLT an optical signal which is obtained by modulating the optical signal of the predetermined frequency. The optical dividing/coupling unit is configured to divide or couple the optical signal transmitted and received between the OLT and the ONU.

The ONU may include a frequency selective filter configured to separate an optical signal of a predetermined frequency from the optical signal of the predetermined range of frequencies.

The OLTs or the ONUs are connected to different optical dividing/coupling units, respectively, and the different optical dividing/coupling units are connected to an optical circulator to form a ring architecture.

According to the present invention, the open optical access network system allows services to be provided in various manners as shown in table 1.

TABLE 1

|  | Sub-scriber-1 | Sub-scriber-2 | Sub-scriber-3 | Sub-scriber-4 | ... | Sub-scriber-n |
|---|---|---|---|---|---|---|
| Internet | SP2 | SP1 | SP1 | SP2 | ... | SP4 |
| IPTV | SP2 | SP3 | SP1 | SP2 | ... | SP2 |
| VoIP | SP2 | SP2 | SP2 | SP2 | ... | SP1 |
| VoD | SP2 | SP4 | SP1 | SP1 | ... | SP2 |

Subscriber 1 receives all services from only service provider 2 (SP2). This means that a signal of a single wavelength is transmitted and received.
Subscriber 2 receives different services from respective service providers. This case corresponds to an example shown in FIG. 3 where wavelength division multiplexed optical signals are transmitted and received.
Subscriber 3 receives a VoIP service together with subscriber 1 and subscriber 2 from service provider 2 (SP2) but receives another service from service provider 1 (SP1). This case corresponds to an example shown in FIG. 5 where a time division multiplexed optical signal and a wavelength division multiplexed optical signal are transmitted and received.

Advantageous Effects

The open optical access network system according to the present invention allows service providers to be connected to users through a single optical infrastructure and also enhances the efficiency in use of the optical infrastructure through a flexible select and change in service.

Additional features of the invention will be set forth in the description which follows, and in part will be apparent from the description, or may be learned by practice of the invention.

MODE FOR INVENTION

The invention is described more fully hereinafter with reference to the accompanying drawings, in which exemplary embodiments of the invention are shown.

Figure 1:
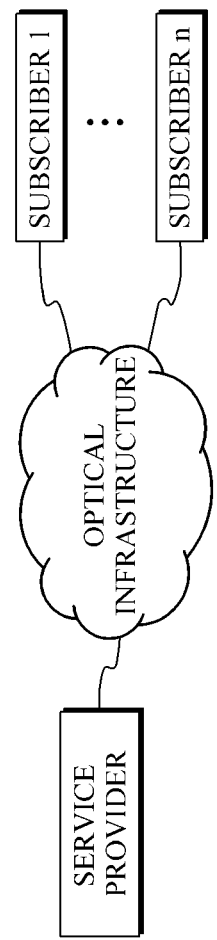
FIG. 1 is a diagram schematically illustrating a conventional optical access network.
Figure 2:
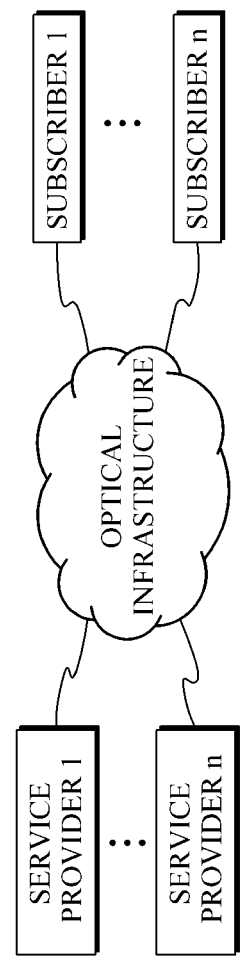
FIG. 2 is a diagram schematically illustrating an example of an open optical access network system.

FIG. 2 is a diagram schematically illustrating an example of an open optical access network system.

A plurality of service providers (a service provider 1, ..., a service provider n) are connected to a plurality of subscribers (a subscriber 1, ..., a subscriber n) through a signal optical infrastructure. The optical infrastructure is provided with an optical dividing/coupling unit which is connected to the plurality of service providers such that optical signals transmitted from the respective service providers are sent to a remote node.

The remote node is provided with an optical divider coupler to transmit the optical signals transmitted from the respective service providers to subscriber which may be implemented as ONUs.

Each of the ONUs is provided with a wavelength selector and an optical transmitting/receiving unit to selectively receive a desired optical signal of the optical signal transmitted from the service providers. Optical signals transmitted from each subscriber are combined through the remote node and sent to the respective service providers through the optical infrastructure. Accordingly, the service providers receive desired optical signals.

Figure 3:
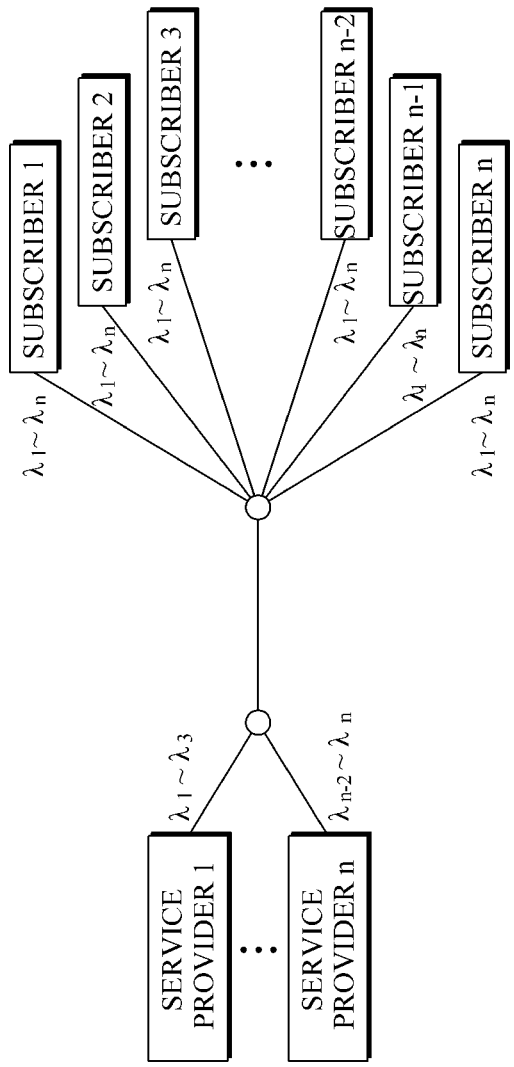
FIG. 3 is a block diagram illustrating an example of an open optical access network system.

FIG. 3 is a block diagram illustrating an example of an open optical access network system.

An open optical access network, to which a plurality of service providers and a plurality of subscribers are connected through an optical infrastructure, includes at least one OLT (OLT) provided at each service provider, a first optical dividing/coupling unit, which may be implemented using an N×1 optical splitter, to divide and couple optical signals, at least one subscriber, an optical line for transmitting the optical signals coupled through the first optical dividing/coupling unit to the subscriber, and a second optical dividing/coupling unit, which may be implemented using an N×1 optical splitter, to divide and couple the transmitted optical signals. Each of the OLTs has an optical transmitting/receiving unit and uses wavelength division multiplexing (WDM). The subscriber has a wavelength selector and an optical transmitting/receiving unit.

The wavelength selector of the subscriber may be implemented using an optical filter having a fixed pass band or a wavelength tunable filter having a tunable pass band. The optical transmitting/receiving unit may be implemented using a wavelength selective light source.

Figure 4:
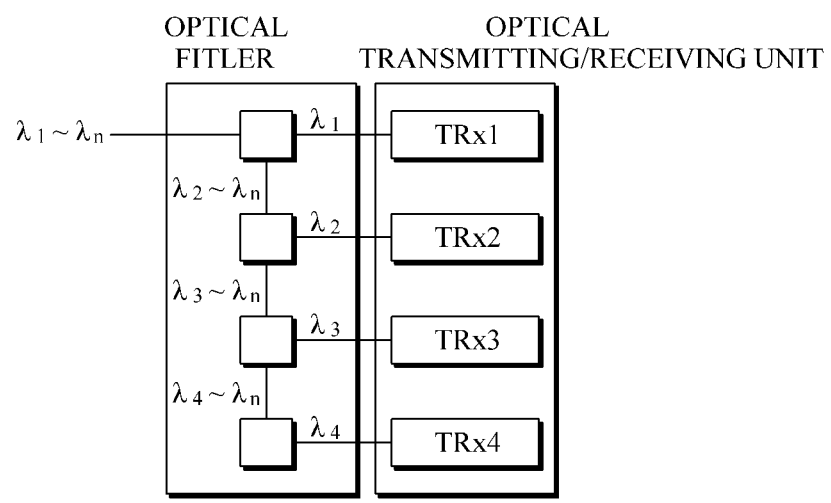
FIG. 4 is a diagram illustrating a subscriber of the open optical access network system shown in FIG. 2.

FIG. 4 is a diagram illustrating a subscriber of the open optical access network system shown in FIG. 2.

A plurality of optical transmitting/receiving units (TRx) of the subscriber may be implemented as individual units or a single integrated unit. Signals transmitted from the OLT are coupled by the first optical dividing/coupling unit and sent through the optical line to the second optical dividing/coupling unit in which the optical signals are divided according to light intensity.

The light dividing/coupling unit does not have wavelength dependency, so the respective subscribers receive signals have the same wavelength. However, each subscriber includes the wavelength selector for selecting a predetermined wavelength, so that the subscriber selects and receives a signal having a desired wavelength.

The light transmitting/receiving unit included in the subscriber does not have wavelength dependency. Accordingly, the light transmitting/receiving unit may send the OLT an upstream signal having the same wavelength as that of the signal input to the subscriber or a upstream signal having a wavelength different from that of the signal input to the subscriber.

The wavelength selector is implemented as an arrayed waveguide grating (AWG) or an AWG having a cyclic characteristic such that an upstream signal and a downstream each having different wavelengths are connected to each other through a single terminal.

The OLTs provided at the service provider and the respective subscriber exchange a signal having a plurality of wavelengths, so the subscriber receives different types of services from a single service provider. In addition, the subscriber may receive different types of services from the respective service providers.

Figure 5:
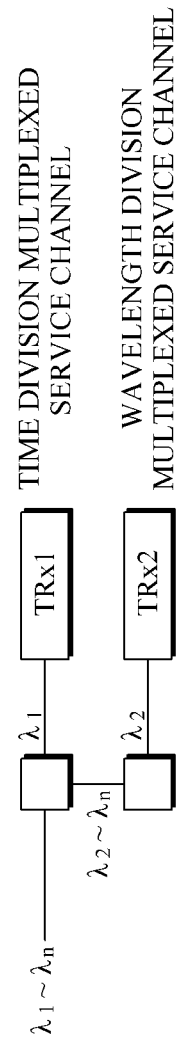
FIG. 5 is a diagram illustrating a subscriber capable of selecting a time division multiplexed channel.

FIG. 5 is a diagram illustrating a subscriber capable of selecting a time division multiplexed channel The open optical access network system includes at least one OLT provided at each service provider, a first optical dividing/coupling unit, which may be implemented using an N×1 optical splitter, to divide and couple optical signals, at least one subscriber, optical fibers for transmitting the optical signals coupled through the first optical dividing/coupling unit to the subscriber, and a second optical dividing/coupling unit, which may be implemented using an N×1 optical splitter, to divide and couple the transmitted optical signals. Each of the OLTs has an optical transmitting/receiving unit and uses WDM and time division multiplexing (TDM). The subscriber has a wavelength selector and an optical transmitting/receiving unit, and has a function of transmitting/receiving a wavelength division multiplexed signal and a TDM signal.

TDM is a technique in which a plurality of signals are coupled to enable the transfer of signals using a single channel in an optical communication. According to TDM, each signal is divided into a plurality of segments having short durations. That is, a single channel is time sliced into high-speed transmission such that a plurality of channels use sliced time slots of a single channel.

Such a service provider having the OLT transmits a time division multiplexed signal having a single wavelength to the subscribers, so that various services are provided using a single wavelength.

Figure 6:
FIG. 6 is a diagram illustrating a subscriber capable of selecting a frequency division multiplexed channel.

FIG. 6 is a diagram illustrating a subscriber dividing/coupling unit capable of selecting a frequency division multiplexed channel.

The open optical access network system includes at least one OLT provided at each service provider, a first optical dividing/coupling unit to divide and couple optical signals, at least one subscriber having an optical transmitting/receiving unit, optical fibers for transmitting the optical signals coupled through the first optical dividing/coupling unit to the subscriber, and a second optical dividing/coupling unit to divide and couple the transmitted optical signals. The subscriber has the optical transmitting/receiving unit configured to transmit and receive a frequency division multiplexed optical signal. The optical transmitting/receiving unit may include a frequency selective filter for dividing the received optical signal according to frequency.

Frequency components included in the optical signal received to the optical transmitting/receiving unit are selected through the frequency selective filter.

The service provider converts a signal of a predetermined range of frequencies assigned to the service provider to an optical signal and sends the optical signal to the subscriber, and each subscriber selects and receives a signal having a desired frequency, thereby enabling effective service selection.

Figure 7:
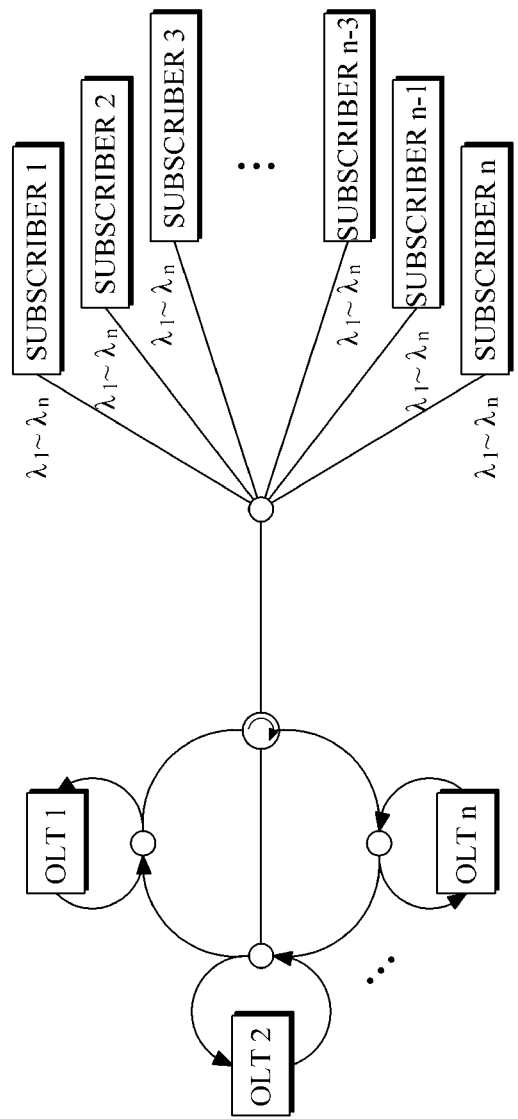
FIG. 7 is a diagram illustrating an example of an open optical access network system having a service provider in a ring-type architecture.

FIG. 7 is a diagram illustrating an example of an open optical access network system wherein service providers are configured in a ring-type architecture.

A downstream signal generated in each OLT is transmitted to the optical infrastructure through the optical dividing/coupling unit, and an upstream signal transmitted from each subscriber is transmitted to each OLT through an optical circulator and the optical dividing/coupling unit, thereby forming a ring-type architecture.

The use of such a ring-type architecture reduces the number of optical fibers required for connecting the OLT and the optical infrastructure. That is, when connecting N OLTs to an optical infrastructure, the ring-type architecture enables N OLTs to be connected to the optical infrastructure using a single optical fiber as shown in FIG. 7, different from a general architecture where N OLTs are connected to an optical infrastructure using N optical fibers.

In addition, when connecting service providers to subscribers through optical fibers, a linear bus open optical access network system, a ring-type open optical access network system or a combination of a linear bus open optical access network system and a ring-type open optical access network system may be configured. The linear bus open optical access network system is configured by installing a plurality of optical dividing/coupling units on the optical line.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. An open optical access network system allowing at least one subscriber to be connected to at least one service provider through a common optical infrastructure, the open optical access network system comprising:
   an optical line terminal (OLT) configured to transmit and receive optical signals that are modulated in a wavelength division multiplexing (WDM) and a time division multiplexing (TDM);
   an optical network unit (ONU) configured to separate and receive an optical signal of a predetermined wavelength from the optical signal received from the OLT, separate and receive an optical signal of a predetermined time from the separated optical signal having the predetermined wavelength, and send the OLT an optical signal which is obtained by modulating the received optical signal of the predetermined wavelength or an optical signal which is obtained by modulating the received optical signal of the predetermined time; and
   an optical dividing/coupling unit configured to divide or couple the optical signal transmitted and received between the OLT and the ONU.

2. The open optical access network system of claim 1, wherein the service provider comprises:
   at least one OLT to perform modulation in a WDM using an optical signal of a predetermined range of wavelengths among an entire range of wavelengths accommodated in the optical infrastructure; or
   an OLT configured to perform modulation in a TDM using an optical signal of a predetermined wavelength.

3. The open optical access network system of claim 1, wherein the ONU comprises:
   a wavelength selector configured to separate an optical signal of a predetermined wavelength from the optical signal received from the OLT; and
   an optical transmitting/receiving unit configured to receive the optical signal of the predetermined wavelength separated by the wavelength selector, select and receive an optical signal of a predetermined time from the separated optical signal having the predetermined wavelength, and send the OLT an optical signal which is obtained by modulating the received optical signal of the predetermined wavelength or an optical signal which is obtained by modulating the received optical signal of the predetermined time.

4. The open optical access network system of claim 1, wherein the optical dividing/coupling unit comprises:
   an N×1 optical splitter connected to the OLT; and
   a 1×N optical splitter connected to the ONU.

5. The open optical access network system of claim 1, wherein the ONU has a wavelength selection function to selectively receive the optical signal of the predetermined wavelength.

* * * * *